United States Patent
Frenkel et al.

(10) Patent No.: US 11,606,461 B2
(45) Date of Patent: Mar. 14, 2023

(54) METHOD FOR TRAINING A SPOOFING DETECTION MODEL USING BIOMETRIC CLUSTERING

(71) Applicant: NICE LTD., Ra'anana (IL)

(72) Inventors: Roman Frenkel, Ashdod (IL); Matan Keret, Oulu (FI); Amit Sharon, Hod-Hasharon (IL)

(73) Assignee: NICE LTD., Ra'anana (IL)

( * ) Notice: Subject to any disclaimer, the term of this patent is extended or adjusted under 35 U.S.C. 154(b) by 276 days.

(21) Appl. No.: 17/112,352

(22) Filed: Dec. 4, 2020

(65) Prior Publication Data

US 2022/0182485 A1 Jun. 9, 2022

(51) Int. Cl.
*H04M 3/12* (2006.01)
*H04M 3/22* (2006.01)
*G06F 17/16* (2006.01)
*G06V 40/40* (2022.01)

(52) U.S. Cl.
CPC .......... *H04M 3/2281* (2013.01); *G06F 17/16* (2013.01); *G06V 40/40* (2022.01)

(58) Field of Classification Search
CPC .............. H04M 3/2281; H04M 7/0078; G06F 17/16; G06V 40/40; H04L 67/1097; H04L 63/1441; G06K 9/6221
See application file for complete search history.

(56) References Cited

U.S. PATENT DOCUMENTS

| | | | | |
|---|---|---|---|---|
| 9,042,867 B2 * | 5/2015 | Gomar | ............ | G10L 17/22 |
| | | | | 455/411 |
| 10,257,591 B2 * | 4/2019 | Gaubitch | ........... | G10L 25/51 |
| 10,616,411 B1 * | 4/2020 | Chang | ............ | H04M 3/2281 |
| 10,659,588 B1 * | 5/2020 | Guan | ............. | H04M 3/385 |
| 10,685,008 B1 * | 6/2020 | Kurve | ............. | G06F 16/23 |
| 10,904,643 B2 * | 1/2021 | Gaubitch | ........... | G10L 25/51 |
| 10,911,600 B1 * | 2/2021 | Frenkel | ............ | G10L 17/08 |
| 11,252,279 B2 * | 2/2022 | Frenkel | ............ | G10L 17/00 |

(Continued)

FOREIGN PATENT DOCUMENTS

| EP | 2437477 A1 * | 4/2012 | ............. | G10L 17/04 |
|---|---|---|---|---|
| WO | WO-2012042200 A1 * | 4/2012 | ............. | G10L 15/26 |

OTHER PUBLICATIONS

U.S. Appl. No. 16/525,606, Method and System for Proactive Fraudster Exposure in a Customer Service Channel, filed Jul. 30, 2019.

(Continued)

*Primary Examiner* — Akelaw Teshale
(74) *Attorney, Agent, or Firm* — Haynes and Boone, LLP

(57) ABSTRACT

Systems for and methods of training a spoofing detection model include receiving a plurality of customer call interactions; classifying each of the plurality of customer call interactions as a spoofed call or a non-spoofed call using a spoofing detection model; generating a voiceprint for each of the plurality of customer call interactions; comparing the generated voiceprints; grouping the generated voiceprints into one or more clusters based on the comparing, wherein each cluster represents a single speaker; locating a cluster containing a spoofed call and a non-spoofed call, thereby indicating that the non-spoofed call was misclassified by the spoofing detection model; and updating the spoofing detection model with the non-spoofed call.

20 Claims, 12 Drawing Sheets

(56) References Cited

U.S. PATENT DOCUMENTS

| | | | | |
|---|---|---|---|---|
| 2012/0072453 | A1* | 3/2012 | Guerra | G06F 21/32 |
| | | | | 707/E17.014 |
| 2013/0216029 | A1* | 8/2013 | Pawlewski | H04M 3/2281 |
| | | | | 379/88.01 |
| 2015/0055763 | A1* | 2/2015 | Guerra | H04M 3/4936 |
| | | | | 379/88.02 |
| 2015/0269941 | A1* | 9/2015 | Jones | H04M 3/42221 |
| | | | | 704/273 |
| 2015/0279372 | A1* | 10/2015 | Papierman | G09B 7/00 |
| | | | | 704/273 |
| 2016/0142534 | A1* | 5/2016 | Guerra | G10L 17/04 |
| | | | | 379/88.02 |
| 2018/0082689 | A1* | 3/2018 | Khoury | G06N 7/005 |
| 2019/0037081 | A1* | 1/2019 | Rao | H04M 3/5175 |
| 2019/0238956 | A1* | 8/2019 | Gaubitch | H04Q 3/70 |
| 2021/0037136 | A1* | 2/2021 | Michaeli | G10L 17/02 |
| 2021/0141879 | A1* | 5/2021 | Calahan | H04M 3/51 |
| 2021/0358503 | A1* | 11/2021 | Keret | H04M 3/42221 |

OTHER PUBLICATIONS

M. Alam, et al.; *Survey on Deep Neural Networks In Speech and Vision Systems*; 2019; 24 pages; https://arxiv.org/ftp/arxiv/papers/1908/1908.07656.pdf).

* cited by examiner

FIG. 8A

METHOD FOR TRAINING A SPOOFING DETECTION MODEL USING BIOMETRIC CLUSTERING

TECHNICAL FIELD

The present disclosure relates to methods, apparatus, and systems to combat spoofing attacks, and more particularly, to training or updating an anti-spoofing model with real spoofing data.

BACKGROUND

Companies and organizations such as call centers try to authenticate people communicating with the organizations to verify that the person communicating is who they say they are, and not an imposter or fraudster. Technology exists to authenticate people using or aided by voice biometrics. For example, in an interactive voice response (IVR) system, a caller can be prompted to speak a phrase, the received audio signal from the caller speaking the phrase can be compared to an existing voice biometrics model for the caller, and if there is a match, authentication is successful and the call can continue.

"Spoofing" refers to an attack using fake biometrics for a valid person. Examples of spoofing include impersonation, replay attacks, voice conversion and speech synthesis. For voice, fraudsters sometimes use tactics such as advanced speech synthesis, voice conversion or imitation, and recorded replay, to try to spoof systems.

Three popular spoofing attack methods typically include a speech synthesis system, playback attacks, and human mimicking. In speech synthesis, a source voice sample is manipulated or trained to sound like the target speaker's speech. In playback attacks, a target's speech is recorded and then played back. In human voice mimicking, a person tries to generate speech like the target speaker.

Because spoofing attacks, including synthetic calls, are rapidly evolving, detecting such attacks and technologies is a big challenge. Actual spoofing data is hard to find, and this data is essential for training an anti-spoofing model.

Accordingly, a need exists for improved methods and systems for training an anti-spoofing model.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 8A illustrates a score matrix with calculated similarity scores for pairs of voiceprints according to embodiments of the present disclosure.

DETAILED DESCRIPTION

Figure 1:
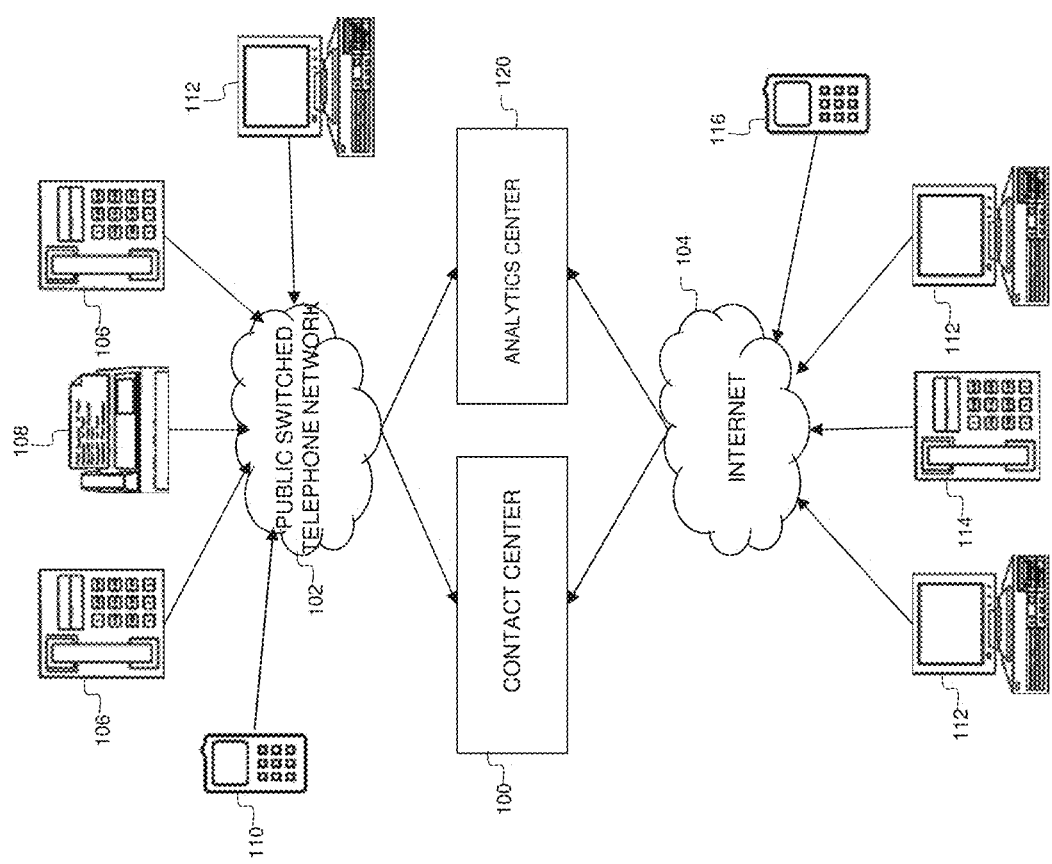
FIG. 1 is a simplified block diagram of an embodiment of a contact center according to various aspects of the present disclosure.

This description and the accompanying drawings that illustrate aspects, embodiments, implementations, or applications should not be taken as limiting—the claims define the protected invention. Various software, machine learning, mechanical, compositional, structural, electrical, and operational changes may be made without departing from the spirit and scope of this description and the claims. In some instances, well-known machine logic, circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present disclosure combines two independent solutions to synergistically tackle spoofed customer call interactions. "Call interactions" as used herein means voice-based interactions, and examples includes traditional telephony, VoIP calls and other internet voice interactions, recorded voice messages whether or not further transmitted, the voice-component of videoconference, video chat or any other interactions, and the like. The first solution is spoofing detection by classifying voice data as spoofed or non-spoofed. A spoofing detection model is applied to each of a plurality of call interactions and each call interaction is classified as a spoofed call or a non-spoofed call. The spoofing detection model can use a variety of spoofing models.

The second solution is proactive fraudster exposure (PFE) by clustering customer call interactions based on a common voice. In general, PFE uses an approach called agglomerative hierarchical clustering (AHC) in order to detect clusters of customer call interactions that share the same speaker (the same voice). An example of PFE is described in more detail in U.S. application Ser. No. 16/525,606 titled "Method and System for Proactive Fraudster Exposure in a Customer Service Channel," which was filed on Jul. 30, 2019 and is incorporated herein in its entirety by express reference thereto.

By leveraging these solutions together, an advanced learning capability is created that leads to improved detection accuracy, and a system that can automatically adjust to new threats. Advantageously, the combined solutions detect spoofed calls and expose this data in a better way.

First, spoofing detection is run on a set of customer call interactions. Then, PFE is run on the same set of customer call interactions (optionally, alternatively or additionally on other customer call interactions). The results of the spoofing detection and the PFE are combined to find clusters including spoofed calls (i.e., spoofed clusters). Once found, assuming there are non-spoofed calls found in the clusters, the spoofing detection model is trained or updated with the non-spoofed calls. Thus, the spoofing detection model can detect new spoofing technology in real-time by being trained on the non-spoofed calls. The spoofing detection model can advantageously evolve to be able to detect new spoofing technology. As used herein, "real-time" generally means during the same customer interaction, i.e., an analysis can be conducted and results provided before the interaction concludes. In preferred embodiments, real-time means within three minutes, preferably within one minute, and more preferably within thirty seconds or less. Real-time can also mean less than about 15 seconds, and even less than about 5 seconds.

FIG. 1 is a simplified block diagram of an embodiment of a contact center 100 according to various aspects of the present disclosure. The term "contact center," as used herein, can include any facility or system server suitable for receiving and recording electronic communications from customers. Such customer communications can include, for example, telephone calls, facsimile transmissions, e-mails, web interactions, voice over IP ("VoIP") calls, and video calls. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer calls in uncompressed audio formats. In the illustrated embodiment, customers may communicate with agents associated with the contact center 100 via multiple different communication networks such as a public switched telephone network (PSTN) 102 or the Internet 104. For example, a customer may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Often, in contact center environments such as contact center 100, it is desirable to facilitate routing of customer communications, particularly based on agent availability, prediction of profile (e.g., personality type) of the customer occurring in association with a customer interaction, matching of customer attributes to agent attributes, and/or matching of customer needs to current agent skills, be it a telephone-based interaction, a web-based interaction, or other type of electronic interaction over the PSTN 102 or Internet 104.

As one of ordinary skill in the art will recognize, based on the guidance herein, that the illustrated example of communication channels associated with a contact center 100 in FIG. 1 is just an example, and the contact center may accept customer interactions, other analyzed interaction information, and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
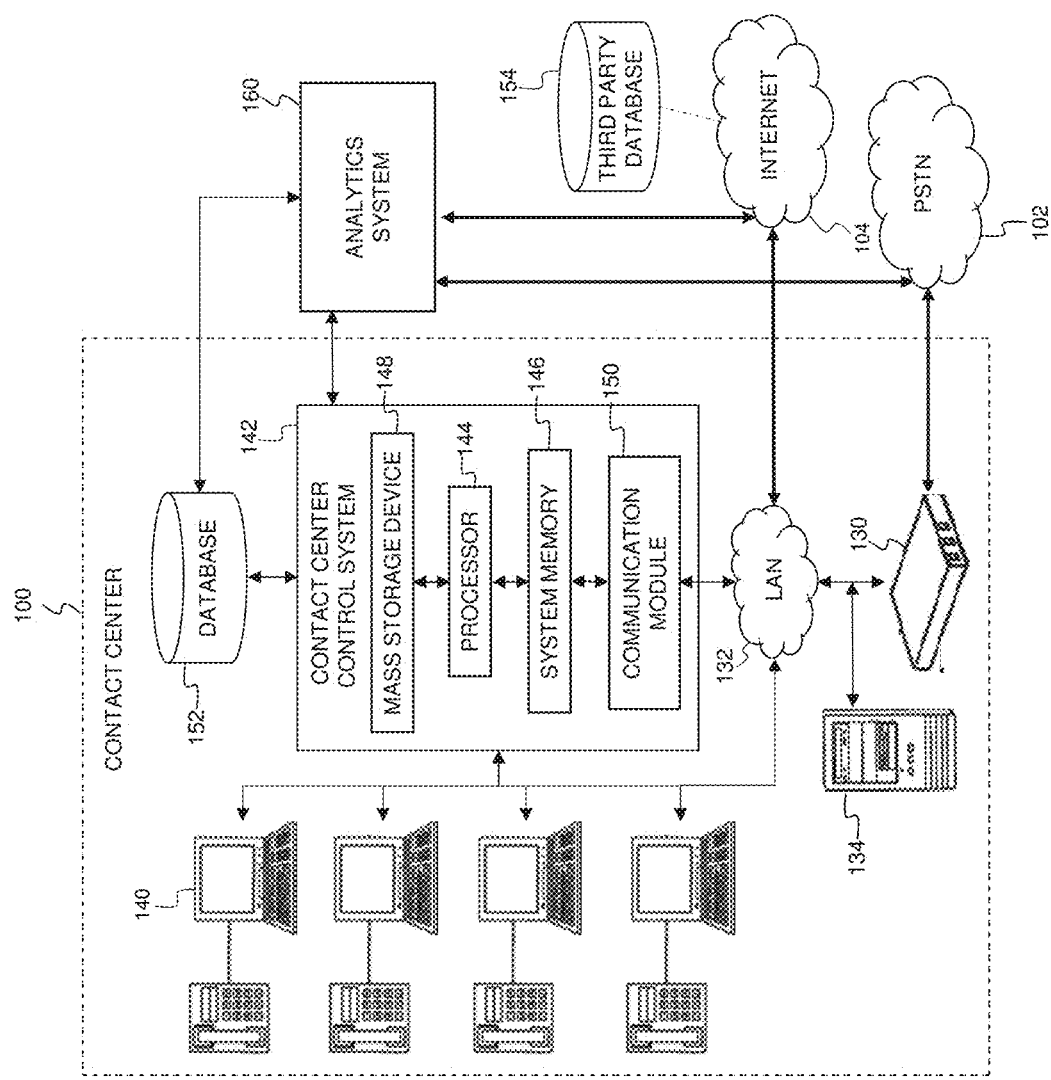
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130 and/or ACD 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art will recognize based on the guidance herein that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in customer interactions over a plurality of communication channels. In one embodiment, each agent workstation 140 may include at least a telephone (e.g., for telephonic or VoIP calls) and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, text (e.g., SMS, MMS), respond to website-based inquires, video chat with a customer, and otherwise participate in various customer interaction sessions across one or more channels including social media postings (e.g., Facebook, LinkedIn, etc.). Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, text analysis, predictive analysis, storage, and other processing functionality to the contact center 100. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a microprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety of other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice data and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, texts (e.g., SMS, MMS, etc.), and instant message conversations. For example, the control system 142 may include a hardware or software-based recording server to capture the audio of a standard or VoIP telephone connection established between an agent workstation 140 and an outside customer telephone system. Further, the audio from an unstructured telephone call or video conference session (or any other communication channel involving audio or video, e.g., a Skype call) may be transcribed manually or automatically and stored in association with the original audio or video. In one embodiment, multiple communication channels (i.e., multi-channel) may be used, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular customer call from the time the call enters the contact center based on the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of calls placed to the contact center, call origination information, reasons for interactions, outcome of interactions, average hold time, agent actions during interactions with customer, manager escalations during calls, types of social media interactions, number of distress events during interactions, survey results, and other interaction information. In addition to collecting interaction data associated with a customer, the control system 142 is also operable to collect biographical profile information specific to a customer including without limitation customer phone number, account/policy numbers, customer "value" data (i.e., customer tenure, money spent as customer, etc.), personality type (as determined by past interactions), and other relevant customer identification. The control system 142 may also collect agent-specific unstructured and structured data including without limitation agent personality type, language skills, technical skills, performance data (e.g., customer retention rate, etc.), and tenure data, training level, average hold time during interactions, manager escalations, agent workstation utilization, and any other agent data relevant to contact center performance. Additionally, the types of data collected by the contact center control system 142 that are identified above are simply examples and additional and/or different interaction data, customer data, agent data, and telephony data may be collected and processed by the control system 142.

Additionally, in some embodiments, an analytics system 160 may also perform some or all of the functionality ascribed to the contact center control system 142 above. For instance, the analytics system 160 may record telephone and internet-based interactions, and/or perform behavioral analyses. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

The control system 142 may store recorded and collected interaction data in a database 152 (also referred to herein as interactions database 152), including customer data and agent data. In certain embodiments, agent data, such as agent scores for dealing with customers, are updated daily.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third-party database 154. In certain embodiments, the control system 142 may query the third-party database for customer data such as credit reports, past transaction data, and other structured and unstructured data.

Figure 3:
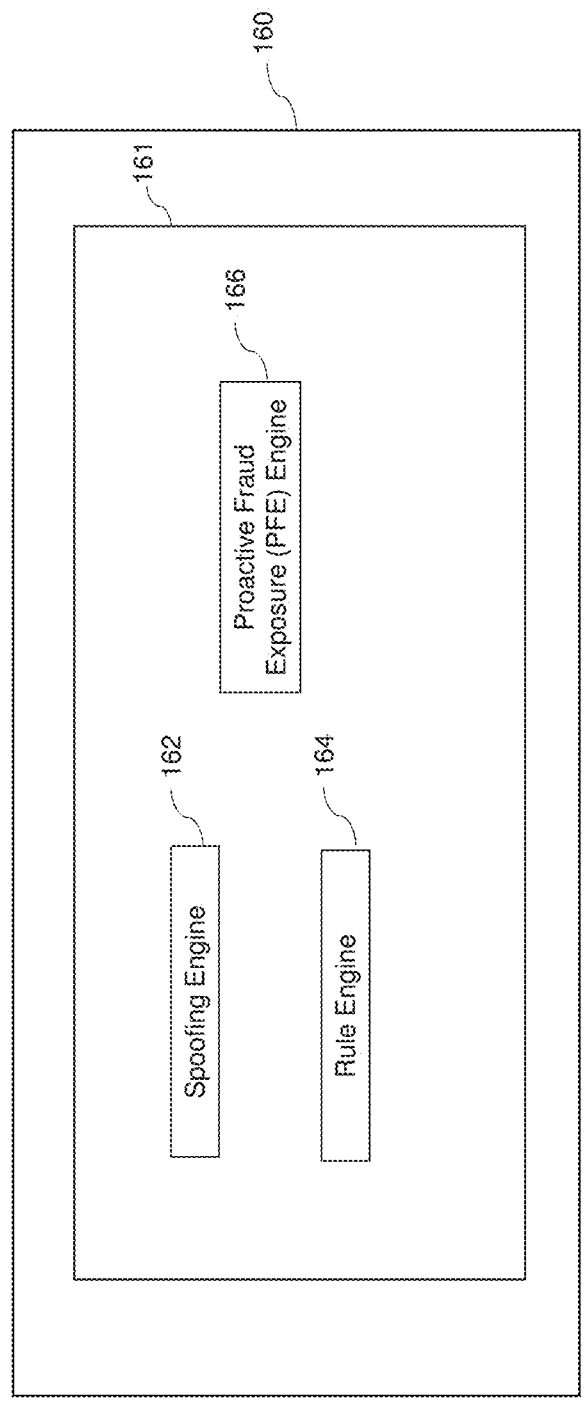
FIG. 3 is a more detailed block diagram of the components of the analytics system of FIG. 2 according to aspects of the present disclosure.

In various embodiments, the analytics system 160 includes its own processor 161 and non-transitory computer-readable storage medium (e.g., system memory, hard drive, etc.) on which to store analytics software and other software instructions. As shown in FIG. 3, in some embodiments, the processor 161 includes a plurality of engines or modules. Examples of suitable engines include a spoofing engine 162, a rule engine 164, and a PFE engine 166, which are described in more detail below.

Figure 4:
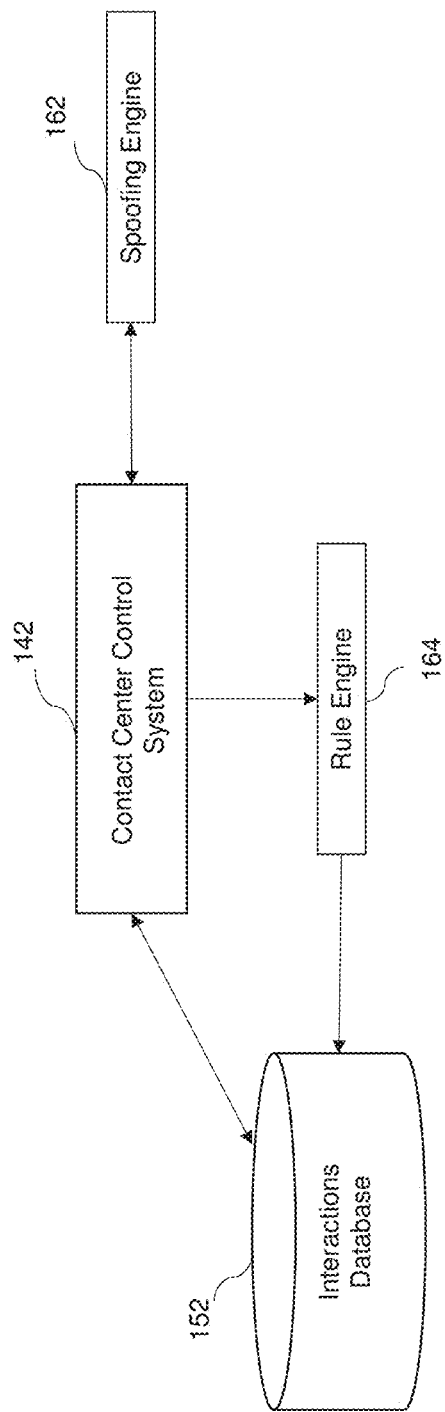
FIG. 4 is a block diagram showing the different components that interact with the spoofing engine according to aspects of the present disclosure.

Referring now to FIG. 4, the spoofing engine 162 applies a spoofing detection model to call interactions and classifies each call interaction as either a spoofed call or a non-spoofed call, as further discussed below. In some embodiments, when a call interaction is taking place, contact center control system 142 passes a request to detect spoofed call interactions to spoofing engine 162.

Figure 5:
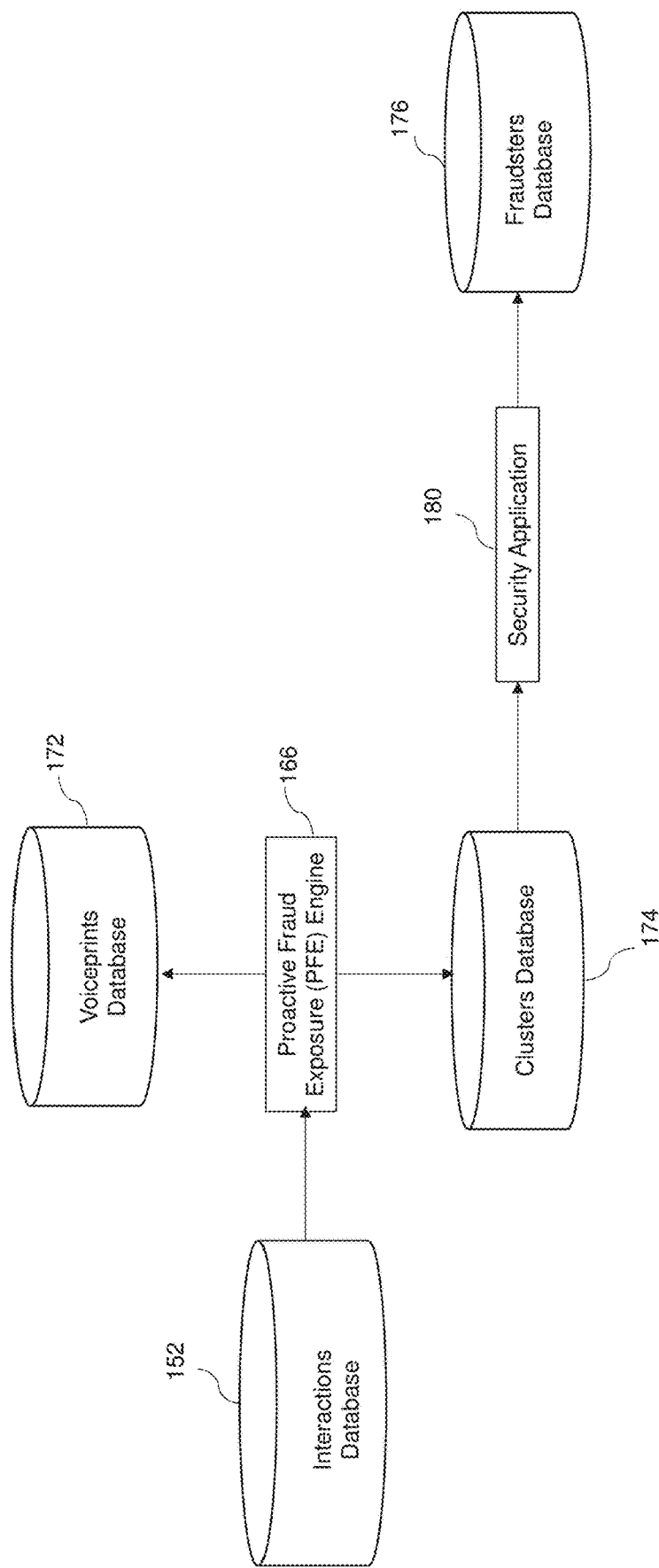
FIG. 5 is a block diagram showing the different components that interact with the proactive fraud exposure engine according to aspects of the present disclosure.

The rule engine 164 applies a set of rules on call interactions received from contact center control system 142 to determine which call interactions should be further analyzed. For example, the set of rules may include rules regarding authentication mismatch, high risk transactions, VIP customers, spoofing detection, or any other type of analytics, which may mark call interactions for further analysis. In an exemplary embodiment, once a call interaction ends, rule engine 164 compares the metadata of a call interaction to the rules and determines which calls should be further analyzed or passed to a security officer. Examples of interaction metadata include interaction ID, local start time, local stop time, GMT start time, GMT stop time, interaction duration, open reason, close reason, switch ID, user ID, interaction type, media type, dialed number (ANI), participants, contact ID, contact start time, and call ID. Examples of customer metadata include customer ID, tenant ID, CRM reference, gender ID, first name, last name, address, birth date, seniority, nationality, state of origin, credit risk, and marital status. In certain embodiments, if a call interaction fails to pass one or more rules, or certain pre-selected critical rules, or a threshold number of rules, or any combination of the foregoing, the call interaction is stored in the interactions database 152 to be later analyzed by the PFE engine 166 in FIG. 5.

The PFE engine 166 retrieves and reads the information of call interactions stored in interactions database 152. Periodically or on schedule, PFE engine 166 collects interactions from interactions database 152. PFE engine 166 then creates a voiceprint per interaction and stores the voiceprint in voiceprints database 172. PFE engine 166 also executes a clustering algorithm to group the generated voiceprints into clusters (as further discussed below). The clustered call interactions and their metadata is saved in clusters database 174. The clustered call interactions may be presented in a security application 180 to a user (e.g., a security officer), who can examine the call interactions, and add fraudsters to a fraudsters database 176 for real-time detection.

Figure 6:
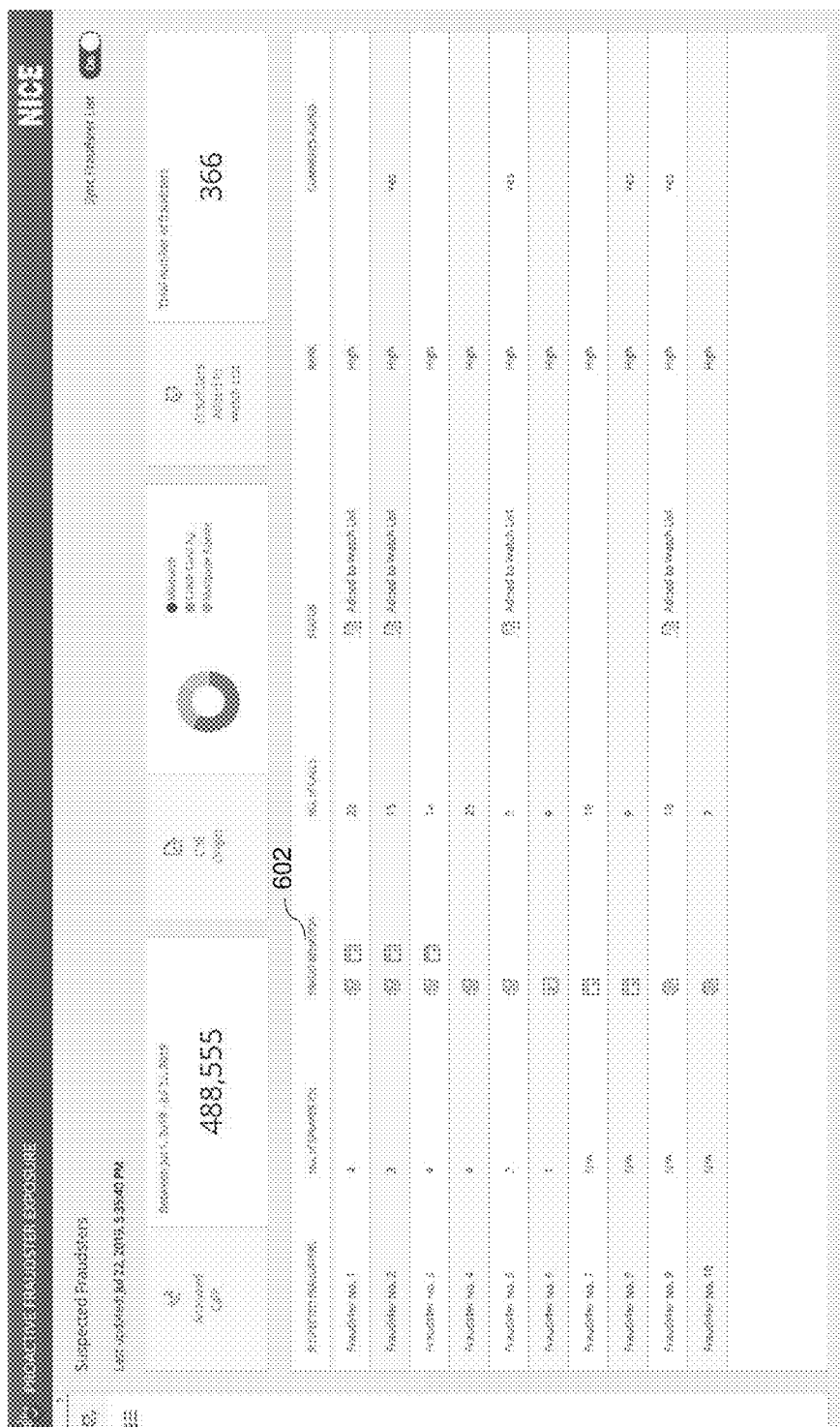
FIG. 6 is a graphical user interface according to aspects of the present disclosure.

FIG. 6 illustrates an exemplary graphical user interface 600 of security application 180. The user is presented with the clusters of call interactions he or she should investigate. The fraud behavior column 602 can have an indication that spoofed calls were found in the cluster so the user will be able to understand that he or she should investigate it. The user may also have the ability to confirm the clusters, add fraudsters to a real-time watchlist, etc. In various embodiments, spoofing engine 162 is not dependent on the user's input in the application 180.

In some embodiments, spoofing engine 162 receives a push notification containing relevant information about the clustered call interactions. It should be understood that any other method known in the art for notification or alert of changes that take place in a system can also be used. In certain embodiments, spoofing engine 162 is periodically examining the clustered call interactions in clusters database 174. If there are new clusters that include spoofed call interactions, spoofing engine 162 examines the clusters against the spoofing analysis results. If there are calls in a cluster that were not identified as spoofed, spoofing engine 162 uses these calls to update the spoofing detection model, which can increase its accuracy in future detection determinations.

Figure 7:
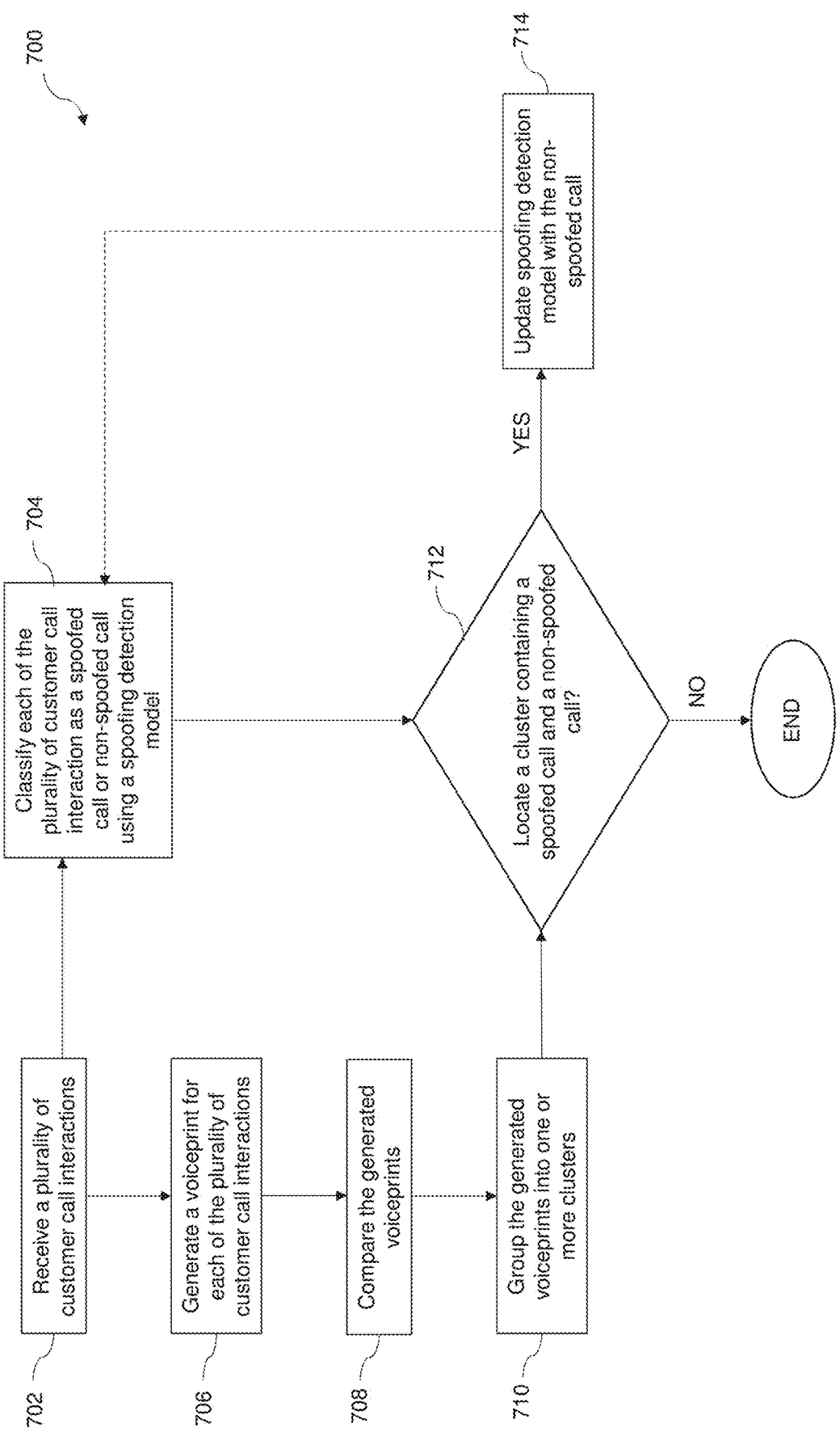
FIG. 7 is a flowchart of a method of training a spoofing detection model according to embodiments of the present disclosure.

Referring now to FIG. 7, a method 700 for training a spoofing detection model is described. At step 702, analytics systems 160 receives a plurality of customer call interactions. The communication type may include one or more voice calls or voice over IP (VoIP). In some embodiments, the call interactions may be extracted from an archive or from a storage server.

At step 704, spoofing engine 162 classifies each of the plurality of customer call interactions as a spoofed call or a non-spoofed call using a spoofing detection model. In various embodiments, given a call interaction, an audio stream of each call interaction is first taken, speech features from the audio stream are extracted, and a spoofing detection model is applied to the speech features to predict whether the call interaction is spoofed or not spoofed.

Feature extraction is a process of dimensionality reduction by which an initial set of raw data is reduced to more manageable groups for processing. The work of feature extraction is to extract those features from the input speech that help the system in identifying the speaker, without causing any damage to the power of the speech signal. Feature extraction can be customized to a specific approach or a standard approach.

In some embodiments, feature extraction is accomplished by changing the speech waveform to a form of parametric representation at a relatively lesser data rate for subsequent processing and analysis. Feature extraction approaches usually yield a multidimensional feature vector for every speech signal. Many feature extraction algorithms, techniques, or models are available, including, but not limited to, perceptual linear prediction (PLP), linear prediction coding (LPC), linear predictive cepstral coefficients (LPCC), power normalized cepstral coefficients (PNCC), relative spectral transform—perceptual linear prediction (RASTA-PLP), mel-frequency cepstrum coefficients (MFCC), use of spectral features, and use of spectral filterbanks. MFCC is the best known and very popular. One or more such feature extraction algorithms, techniques, or models may be used to achieve suitable feature extraction from call interaction information.

Prediction of whether a call interaction is a spoofed call or a non-spoofed call is usually done using a deep learning model. That is, the spoofing detection model is typically a deep learning model that has been trained on how to detect or predict a spoofed call. Deep learning is a class of machine learning algorithms that uses multiple layers to progressively extract higher-level features from the raw input. Deep learning models are built using neural networks. A neural network is a series of algorithms that endeavors to recognize underlying relationships in a set of data through a process that mimics the way the human brain operates. Models are trained by using a large set of labeled data and neural network architectures that contain many layers. A neural network takes in inputs, which are then processed in hidden layers using weights that are adjusted during training. Then the model spits out a prediction. The weights are adjusted to find patterns in order to make better predictions. The user does not need to specify what patterns to look for the neural network learns on its own.

The deep learning model, like the feature extraction model described above, can use a standard approach or be customized (e.g., different parts of different models can be combined) to form a new model. Both customized and standard approaches can include one or more of the following neural networks: an artificial neural network (ANN), a convolutional neural network (CNN), a capsule neural network, a recurrent neural network (RNN), long short-term memory neural network (LSTM), a gated recurrent units (GRU) neural network, a residual neural network, or a generative adversarial network (GAN). Standard neural networks that can be used include, but are not limited to, the ResNet-50 neural network, the ResNet-32 neural network, the visual geometry group (VGG) neural network, the SincNet neural network, the RawNet neural network, the WaveGlow neural network, the speech enhancement generative adversarial network (SEGAN), or the Wasserstein GAN.

At step 706, PFE engine 166 generates a voiceprint for each of the plurality of customer call interactions (and optionally additional customer call interactions). As used herein, a "voiceprint" is a sample of a voice of a user that is used to identify and authenticate the user based on characteristics of the voice. The characteristics of the voice include, but are not limited to, volume, pace, pitch, resonance, articulation, enunciation, respiration, pauses, timber, stress, rhyme, diction, and dialect. In various embodiments, the generated voiceprints are stored in voiceprints database 172.

In some embodiments, PFE engine 166 uses i-vectors to represent the voiceprints. I-vectors may be stored as bytearrays. As used herein, an "i-vector" refers to intermediate vectors or identity vectors that are an enhancement for a previously used approach in speaker verification technology called Joint Factor Analysis (JFA). JFA divides a human voice into two factors: a speaker factor and a channel factor. The data structure of the i-vectors may be an array, and each element in the data structure may represent a characteristic of the speech of a speaker. The i-vectors are generated as part of voiceprint generation for later comparison.

At step 708, PFE engine 166 compares the generated voiceprints. In several embodiments, a threshold similarity score is established, pairs of generated voiceprints are compared, and a similarity score is calculated for each pair. As used herein, "similarity score" refers to comparison of two voiceprints based on extracted i-vectors. In certain embodiments, the similarity scores are calculated based on i-vectors of each voiceprint according to a similarity algorithm.

Figure 8A:
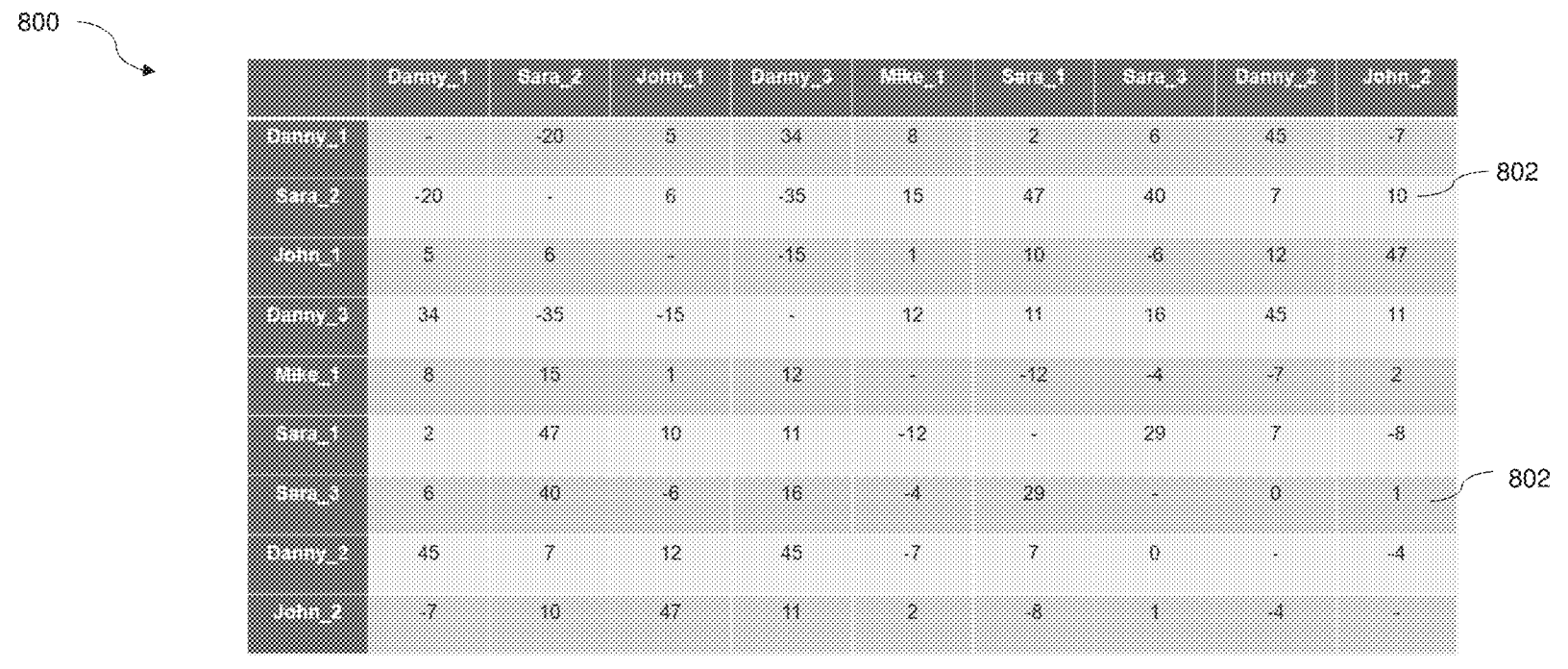

Turning now to FIG. 8A, a score matrix 800 is shown with calculated similarity scores 802 for pairs of voiceprints. For example, the similarity score for the voiceprint of Danny_1 and Danny_2 is 45, while the similarity score for the voiceprint of John_1 and Sara_3 is −6.

At step 710, PFE engine 166 groups the generated voiceprints into one or more clusters based on the comparing step, where each cluster represents a single speaker. As used herein, a "cluster" is a set of call interactions that represents a single speaker performing multiple calls. In some embodiments, if a generated voiceprint has no other voiceprint like it, a cluster of size one is created. In certain embodiments, PFE engine 166 outputs a data structure (e.g., an xml file or a json file) that reveals a unique cluster number, and in the unique cluster number, a list of voiceprint identifiers. The latent data structure may be a list of dictionaries, hash tables, or lists.

According to some embodiments, pairs of generated voiceprints are grouped into a cluster when the similarity score for the pair exceeds the threshold similarity score. Given a threshold similarity score, for example 25, a clustering algorithm looks for the highest score in each row that exceeds the threshold and groups those voiceprints together. In some embodiments, the clustering algorithm is illustrated by the following pseudo code:
Given N interactions, and a threshold (T)–init N empty groups (G).
Create a N×N matrix (M) containing compare scores of all pairwise comparisons.
Diagonal values should be (−infinity).
For i from 0 to N:
 Find the maximum value for row i, let's say it's in index j
 if maximum>T:
  if G[i] and G[j] are both empty—assign them to a new cluster.
  if G[i] is empty and G[j] is not—assign G[i] to G[j] (and vice versa).
  if G[i] and G[j] are both assigned—merge them.
 If not:
  G[i] is assigned to a new cluster.
T may be determined in the following way:
Take all the pairwise scores, calculate their mean and variance.

$$T = \text{mean} - Z * \text{variance}$$

Where Z is empirically tested to be from 1 to 2 (commonly 2)

Optionally, when detecting extremely large clusters, for example more than 100 call interactions in one cluster, sub-clusters can be created by running the clustering algorithm again.

Figure 8B:
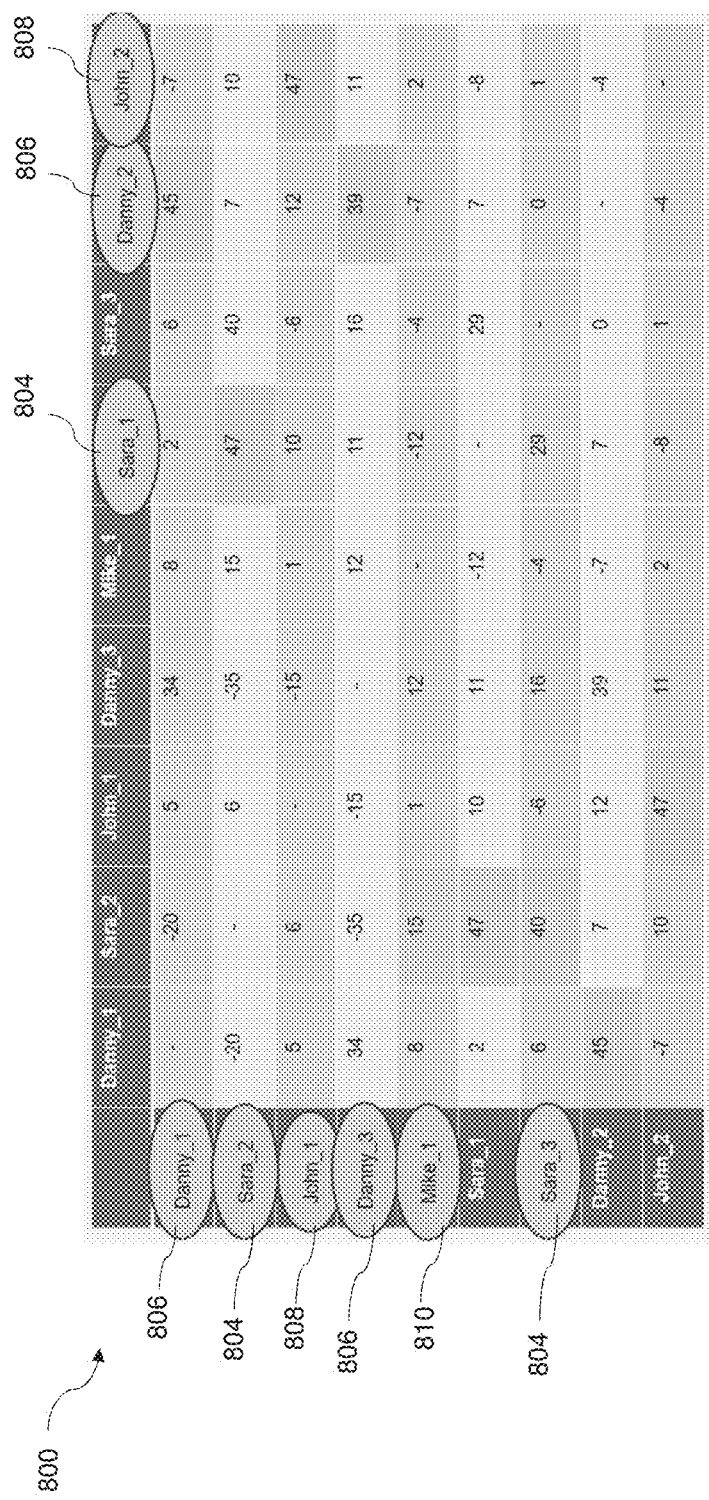
FIG. 8B illustrates the score matrix of FIG. 8A that is marked to show the voiceprints that will be grouped together into a cluster according to embodiments of the present disclosure.

Looking at FIG. 8B, in the first row, the highest score is 45; in the second row, the highest score is 47; in the third row, the highest score is 47; and in the fourth row, the highest score is 39; in the fifth row, the highest score is 15, which does not exceed the threshold; in the sixth row, the highest score is 47; in the seventh row, the highest score is 40; in the eighth row, the highest score is 45; and in the ninth row, the highest score is 47. FIG. 8B marks the voiceprints 804, 806, 808, 810 that will be grouped together. In the case of the voiceprint 810 of Mike_1, a cluster with just one voiceprint will be created.

Figure 9B:
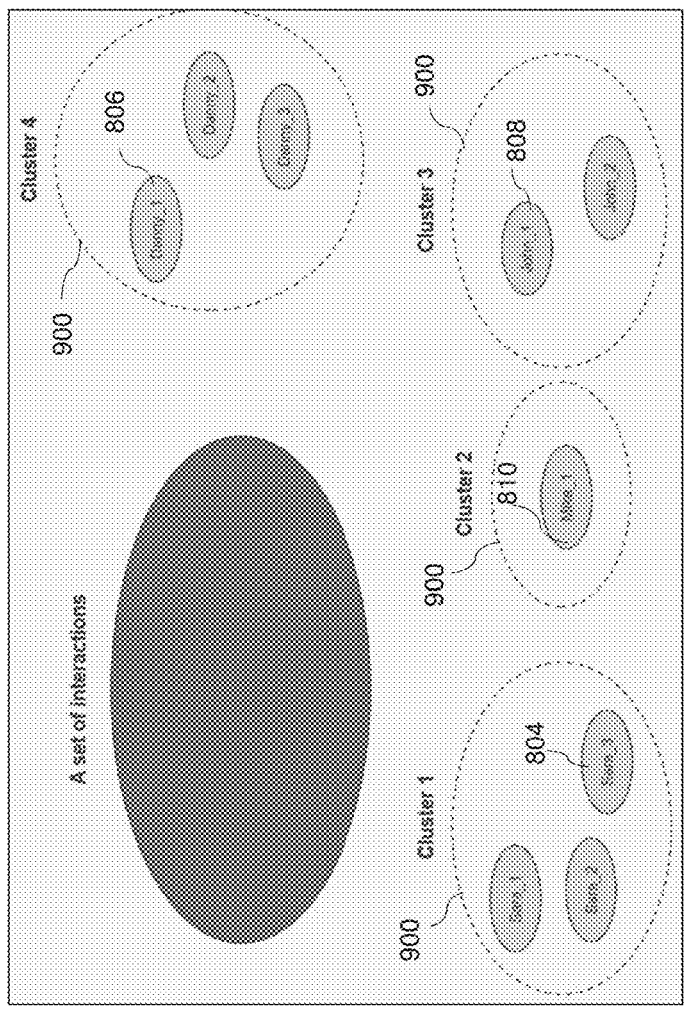
FIG. 9B illustrates how the marked voiceprints from FIG. 9A are grouped into clusters according to embodiments of the present disclosure.
Figure 9A:
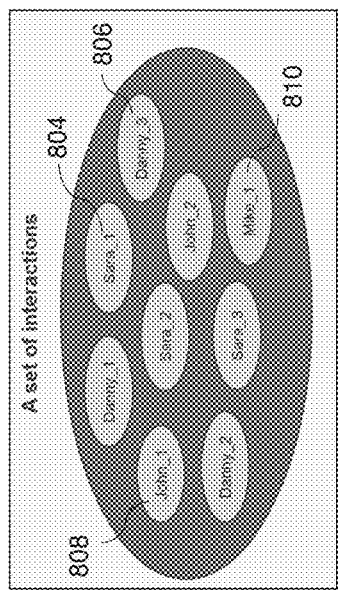
FIG. 9A illustrates that the marked voiceprints from FIG. 8B form a set of call interactions according to embodiments of the present disclosure.

Turning now to FIG. 9A, the marked voiceprints 804, 806, 808, 810 from FIG. 8B are shown to illustrate a set of interactions. FIG. 9B illustrates how the marked voiceprints 804, 806, 808, 810 are grouped into clusters 900 based on the speakers.

In various embodiments, a ranking algorithm calculates a confidence score for each cluster by comparing all the generated voiceprints in each cluster against each other. The confidence score provides a value based on the inner ties between the voiceprints in the cluster. For example, referring back to FIG. 9B, for cluster 3, the ranking algorithm would calculate the confidence score between the voiceprint of John_1 and the voiceprint of John 2. The ranking algorithm can use the confidence score to sort or rank the clusters from high to low, and use the highest-ranked clusters to locate the cluster containing a spoofed call and a non-spoofed call in step 712.

In various embodiments, the ranking algorithm is illustrated by the following pseudo code, given N clusters:
Init an empty array A
For i from 1 to N:
TmpSum=Sum(all pairwise compares in cluster i)
clusterMean=TmpSum/numberOfCompares
clusterVariance=variance(allpairwise compares in cluster i)
clusterScore=clusterMean/(clusrerVariance+1)
A.append(clusterScore, i)
A=A.sort #based on clusterScore
Display to the user 'y' highest scored clusters.

In various embodiments, to calculate the confidence score, the confidence of the inner ties within a cluster is calculated. In some embodiments, the ranking algorithm takes every voiceprint in a cluster and compares it to all the other voiceprints within the cluster to produce N−1 scores, where N is the number of voiceprints in the cluster. This can be repeated for all voiceprints in the cluster, producing N(N−1) scores. Since the scores are symmetric, score (1,2)=score (2,1). Effectively, it is enough to calculate half, denoted as M, and $$\frac{N(N-1)}{2} = M \text{ scores}.$$

In certain embodiments, the confidence scores are normalized. One way to normalize the confidence score is to sum up all the scores and divide it by M, $$conf1 = \frac{\Sigma \text{ Score}}{M}.$$

Another way to normalize the confidence score is to calculate the mean of the scores and divide it by the standard deviation, $$conf2 = \frac{conf1}{\Sigma(conf1 - score)}.$$

In some embodiments, the second way is preferred. In several embodiments, only the highest scored clusters (e.g., top 30%) are passed to the next step 712.

Figure 10:
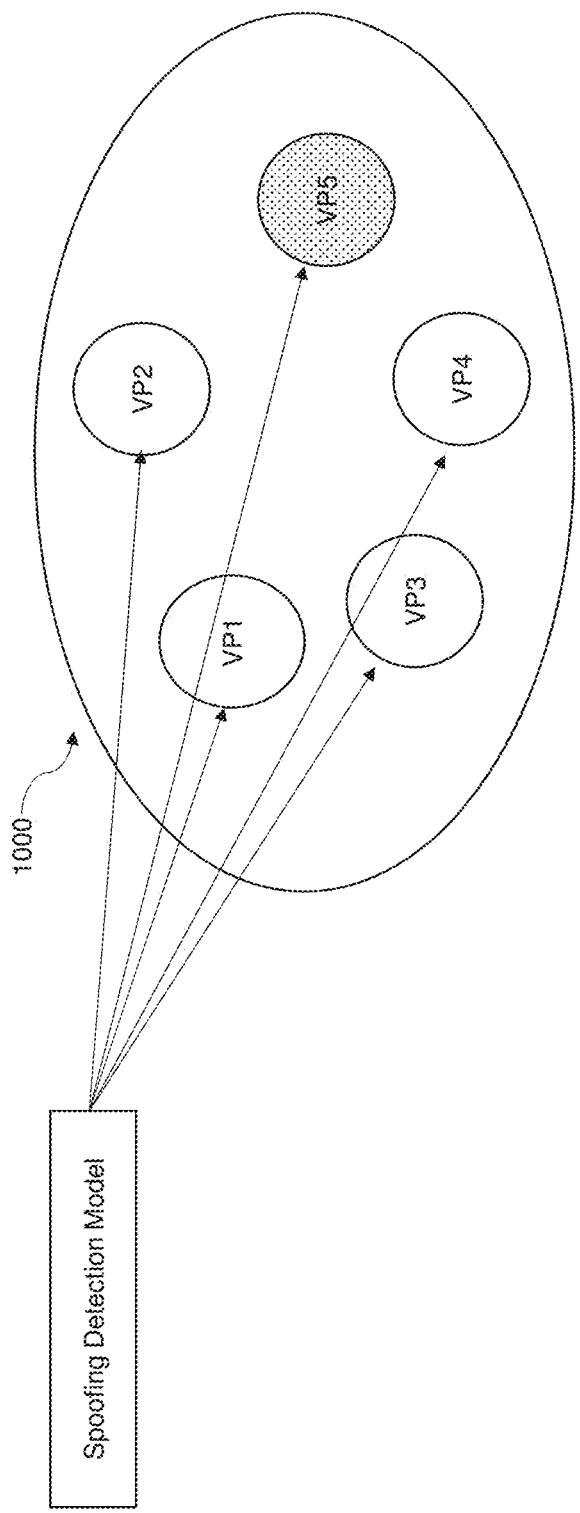
FIG. 10 illustrates a cluster containing voiceprints that were classified by the spoofing detection model according to embodiments of the present disclosure.

In step 712, analytics system 160 (e.g., spoofing engine 162) attempts to locate a cluster containing both a spoofed call and a non-spoofed call. FIG. 10 illustrates a cluster 1000 containing 5 voiceprints that were classified by the spoofing detection model. While voiceprints 1-4 were correctly classified as spoofed calls, voiceprint 5 was misclassified by the spoofing detection model as a non-spoofed call.

In one example, a cluster having 10 voiceprints with 9 voiceprints classified as spoofed, and 1 voiceprint classified as non-spoofed would be a relevant cluster to focus on. This "synthetic cluster" indicates that the non-spoofed call was misclassified by the spoofing detection model. In this case, the misclassified call can be update or train the spoofing detection algorithm to mimimize such misclassification in the future.

If a cluster containing both a spoofed call and a non-spoofed call is not found, the method 700 ends. If a synthetic cluster is found, the non-spoofed call can optionally be sent to a security officer to decide if it is, in fact, a spoofed call. In other embodiments, the non-spoofed call is automatically deemed as spoofed, and the non-spoofed call is sent to one or more dedicated spoofing engines that are used solely for ongoing training of the spoofing detection model (together with more call interactions like it if found) to train the spoofing detection model. Use of such a dedicated spoofing engine for training can thus minimize or avoid affecting the real-time operation of the regular spoofing engines described herein. In some embodiments, the non-spoofed call can be sent to spoofing engine 162 to update the spoofing detection model.

In step 714, analytics system 160 (e.g., spoofing engine 162) updates or trains the spoofing detection model with the non-spoofed call. The spoofing detection model can be updated using the non-spoofed call so as to train the spoofing detection model to detect any patterns in the non-spoofed call that were not previously detected. The patterns help the spoofing detection model learn and make better predictions. The spoofing detection model is updated so that the model will provide the right outcome (e.g. classification of call as a spoofed call), when new call interactions are run through the spoofing detection model. In various embodiments, steps 704, 710, and 712 are repeated with the updated spoofing detection model.

A specific example will now be described below. A spoofing detection model was initially trained with one dataset of call interactions, and evaluated on 4 separate datasets. The spoofing detection model was then trained with portions of the other 4 datasets, and the results are provided in Table 1 below. As can be seen, the spoofing detection rate significantly increased after the model was trained on those datasets.

TABLE 1

RESULTS OF TRAINING A MODEL

| | Spoofing detection rate (@ 0.1% false alarm rate) Model was not trained on those sets | Spoofing detection rate (@ 0.1% false alarm rate) After model trained on those sets |
|---|---|---|
| Dataset 1 | 99.7% | 99.7% |
| Dataset 2 | 51% | 95.3% |
| Dataset 3 | 0% | 70% |
| Dataset 4 | 57% | 90% |

In some embodiments, the analytics system 160 receives a plurality of additional customer call interactions, and the spoofing detection model is updated or trained with the additional customer call interactions. The additional customer call interactions assist the spoofing detection model with detecting patterns that predict whether or not a call interaction is a spoofed call or a non-spoofed call.

Figure 11:
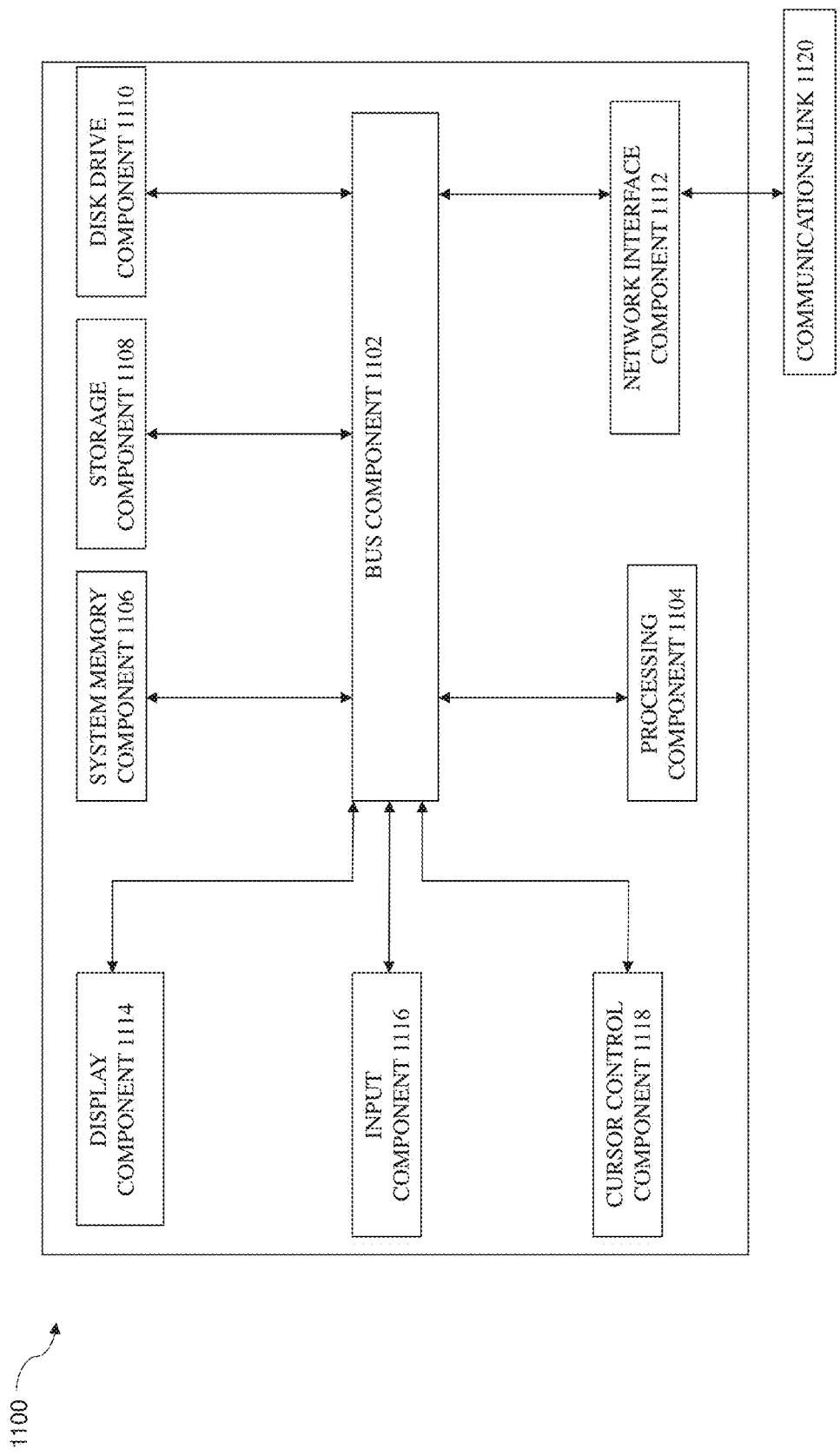
FIG. 11 is a block diagram of a computer system suitable for implementing one or more components in FIG. 1, 2, or 3 according to one embodiment of the present disclosure.

Referring now to FIG. 11, illustrated is a block diagram of a system 1100 suitable for implementing embodiments of the present disclosure, including analytics system 160. System 1100, such as part a computer and/or a network server, includes a bus 1102 or other communication mechanism for communicating information, which interconnects subsystems and components, including one or more of a processing component 1104 (e.g., processor, micro-controller, digital signal processor (DSP), etc.), a system memory component 1106 (e.g., RAM), a static storage component 1108 (e.g., ROM), a network interface component 1112, a display component 1114 (or alternatively, an interface to an external display), an input component 1116 (e.g., keypad or keyboard), and a cursor control component 1118 (e.g., a mouse pad).

In accordance with embodiments of the present disclosure, system 1100 performs specific operations by processor 1104 executing one or more sequences of one or more instructions contained in system memory component 1106. Such instructions may be read into system memory component 1106 from another computer readable medium, such as static storage component 1108. These may include instructions to receive a plurality of customer call interactions; classify, by a spoofing engine, each of the plurality of customer call interactions as a spoofed call or a non-spoofed call using a spoofing detection model; generate, by a PFE engine, a voiceprint for each of the plurality of customer call interactions; compare, by the PFE engine, the generated voiceprints; group, by the PFE engine, the generated voiceprints into one or more clusters based on the comparing, wherein each cluster represents a single speaker; locate a cluster containing a spoofed call and a non-spoofed call, thereby indicating that the non-spoofed call was misclassified by the spoofing detection model; and update the spoofing detection model with the non-spoofed call. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 1104 for execution. Such a medium may take many forms, including but not limited to, non-volatile media, volatile media, and transmission media. In various implementations, volatile media includes dynamic memory, such as system memory component 1106, and transmission media includes coaxial cables, copper wire, and fiber optics, including wires that comprise bus 1102. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 1100. In various other embodiments, a plurality of systems 1100 coupled by communication link 1120 (e.g., networks 102 or 104 of FIG. 2, LAN 132, WLAN, PTSN, or various other wired or wireless networks) may perform instruction sequences to practice the disclosure in coordination with one another. Computer system 1100 may transmit and receive messages, data, information and instructions, including one or more programs (i.e., application code) through communication link 1120 and communication interface 1112. Received program code may be executed by processor 1104 as received and/or stored in disk drive component 1110 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. A system comprising:
    a processor and a computer readable medium operably coupled thereto, the computer readable medium comprising a plurality of instructions stored in association therewith that are accessible to, and executable by, the processor, to perform operations which comprise:
        receiving a plurality of customer call interactions;
        classifying, by a spoofing engine, each of the plurality of customer call interactions as a spoofed call or a non-spoofed call using a spoofing detection model;
        generating, by a proactive fraud exposure (PFE) engine, a voiceprint for each of the plurality of customer call interactions;
        comparing, by the PFE engine, the generated voiceprints;
        grouping, by the PFE engine, the generated voiceprints into one or more clusters based on the comparing, wherein each cluster represents a single speaker;
        locating a cluster containing a spoofed call and a non-spoofed call, thereby indicating that the non-spoofed call was misclassified by the spoofing detection model; and
        updating the spoofing detection model with the non-spoofed call.

2. The system of claim 1, wherein:
    comparing the generated voiceprints comprises comparing pairs of generated voiceprints and calculating similarity scores for each pair, and
    the operations further comprise establishing a threshold similarity score.

3. The system of claim 2, wherein each pair of generated voiceprints is grouped into a cluster when the similarity score for the pair exceeds the threshold similarity score.

4. The system of claim 1, wherein the operations further comprise calculating a confidence score for each cluster by comparing all the generated voiceprints in each cluster against each other.

5. The system of claim 4, wherein the operations further comprise ranking the plurality of clusters from high to low based on the confidence score and using the highest-ranked clusters to locate the cluster containing a spoofed call and a non-spoofed call.

6. The system of claim 1, wherein the operations further comprise:
    classifying each of the plurality of customer call interactions as a spoofed call or a non-spoofed call using the updated spoofing detection model;
    detecting a cluster containing a spoofed call and a non-spoofed call, thereby indicating that the non-spoofed call in the detected cluster was misclassified by the updated spoofing detection model; and
    re-updating the updated spoofing detection model with the non-spoofed call in the detected cluster.

7. The system of claim 1, wherein classifying each of the plurality of customer call interactions as a spoofed call or a non-spoofed call comprises:
    extracting speech features from an audio stream of each customer call interaction; and
    predicting whether the extracted speech features indicate a spoofed call or a non-spoofed call.

8. The system of claim 1, wherein the operations further comprise transmitting the non-spoofed call to a security officer for confirmation that the non-spoofed call was misclassified.

9. The system of claim 1, wherein the operations further comprise:
    receiving a plurality of additional customer call interactions; and
    updating the spoofing detection model with the additional customer call interactions.

10. A method of training a spoofing detection model, which comprises:
    receiving a plurality of customer call interactions;
    classifying, by a spoofing engine, each of the plurality of customer call interactions as a spoofed call or a non-spoofed call using a spoofing detection model;
    generating, by a proactive fraud exposure (PFE) engine, a voiceprint for each of the plurality of customer call interactions;
    comparing, by the PFE engine, the generated voiceprints;
    grouping, by the PFE engine, the generated voiceprints into one or more clusters based on the comparing, wherein each cluster represents a single speaker;

locating a cluster containing a spoofed call and a non-spoofed call, thereby indicating that the non-spoofed call was misclassified by the spoofing detection model; and updating the spoofing detection model with the non-spoofed call.

11. The method of claim 10, further comprising calculating a confidence score for each cluster by comparing all the generated voiceprints in each cluster against each other.

12. The method of claim 11, further comprising ranking the plurality of clusters from high to low based on the confidence score and using the highest-ranked clusters to locate the cluster containing a spoofed call and a non-spoofed call.

13. The method of claim 10, further comprising:
classifying each of the plurality of customer call interactions as a spoofed call or a non-spoofed call using the updated spoofing detection model;
detecting a cluster containing a spoofed call and a non-spoofed call, thereby indicating that the non-spoofed call in the detected cluster was misclassified by the updated spoofing detection model; and
re-updating the updated spoofing detection model with the non-spoofed call in the detected cluster.

14. The method of claim 10, wherein classifying each of the plurality of customer call interactions as a spoofed call or a non-spoofed call comprises:
extracting speech features from an audio stream of each customer call interaction; and
predicting whether the extracted speech features indicate a spoofed call or a non-spoofed call.

15. The method of claim 10, further comprising:
receiving a plurality of additional customer call interactions; and
updating the spoofing detection model with the additional customer call interactions.

16. A non-transitory computer-readable medium having stored thereon computer-readable instructions executable by a processor to perform operations which comprise:
receiving a plurality of customer call interactions;
classifying, by a spoofing engine, each of the plurality of customer call interactions as a spoofed call or a non-spoofed call using a spoofing detection model;
generating, by a proactive fraud exposure (PFE) engine, a voiceprint for each of the plurality of customer call interactions;
comparing, by the PFE engine, the generated voiceprints;
grouping, by the PFE engine, the generated voiceprints into one or more clusters based on the comparing, wherein each cluster represents a single speaker;
locating a cluster containing a spoofed call and a non-spoofed call, thereby indicating that the non-spoofed call was misclassified by the spoofing detection model; and
updating the spoofing detection model with the non-spoofed call.

17. The non-transitory computer-readable medium of claim 16, wherein the operations further comprise:
calculating a confidence score for each cluster by comparing all the generated voiceprints in each cluster against each other;
ranking the plurality of clusters from high to low based on the confidence score; and
using the highest-ranked clusters to locate the cluster containing a spoofed call and a non-spoofed call.

18. The non-transitory computer-readable medium of claim 16, wherein the operations further comprise:
classifying each of the plurality of customer call interactions as a spoofed call or a non-spoofed call using the updated spoofing detection model;
detecting a cluster containing a spoofed call and a non-spoofed call, thereby indicating that the non-spoofed call in the detected cluster was misclassified by the updated spoofing detection model; and
re-updating the updated spoofing detection model with the non-spoofed call in the detected cluster.

19. The non-transitory computer-readable medium of claim 16, wherein classifying each of the plurality of customer call interactions as a spoofed call or a non-spoofed call comprises:
extracting speech features from an audio stream of each customer call interaction; and
predicting whether the extracted speech features indicate a spoofed call or a non-spoofed call.

20. The non-transitory computer-readable medium of claim 16, wherein the operations further comprise:
receiving a plurality of additional customer call interactions; and
updating the spoofing detection model with the additional customer call interactions.

* * * * *